June 18, 1935.  P. M. BOURDON  2,005,607
COUPLING FOR BOGIE AXLES
Filed April 3, 1934   2 Sheets-Sheet 1
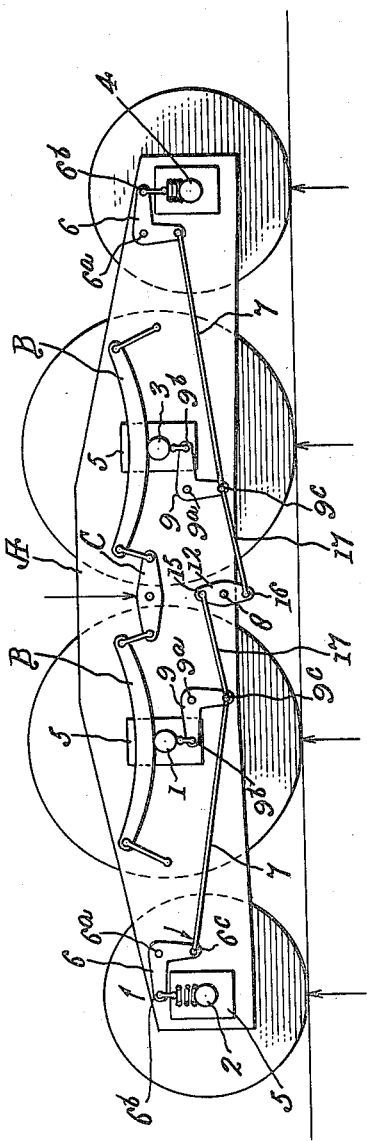
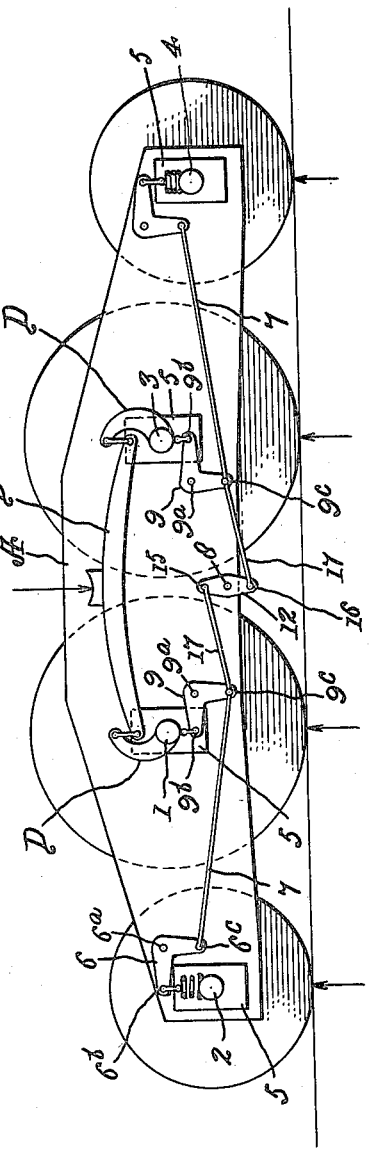
Inventor
Pierre Marcel Bourdon
By Wilkinson & Mawhinney
Attorneys.

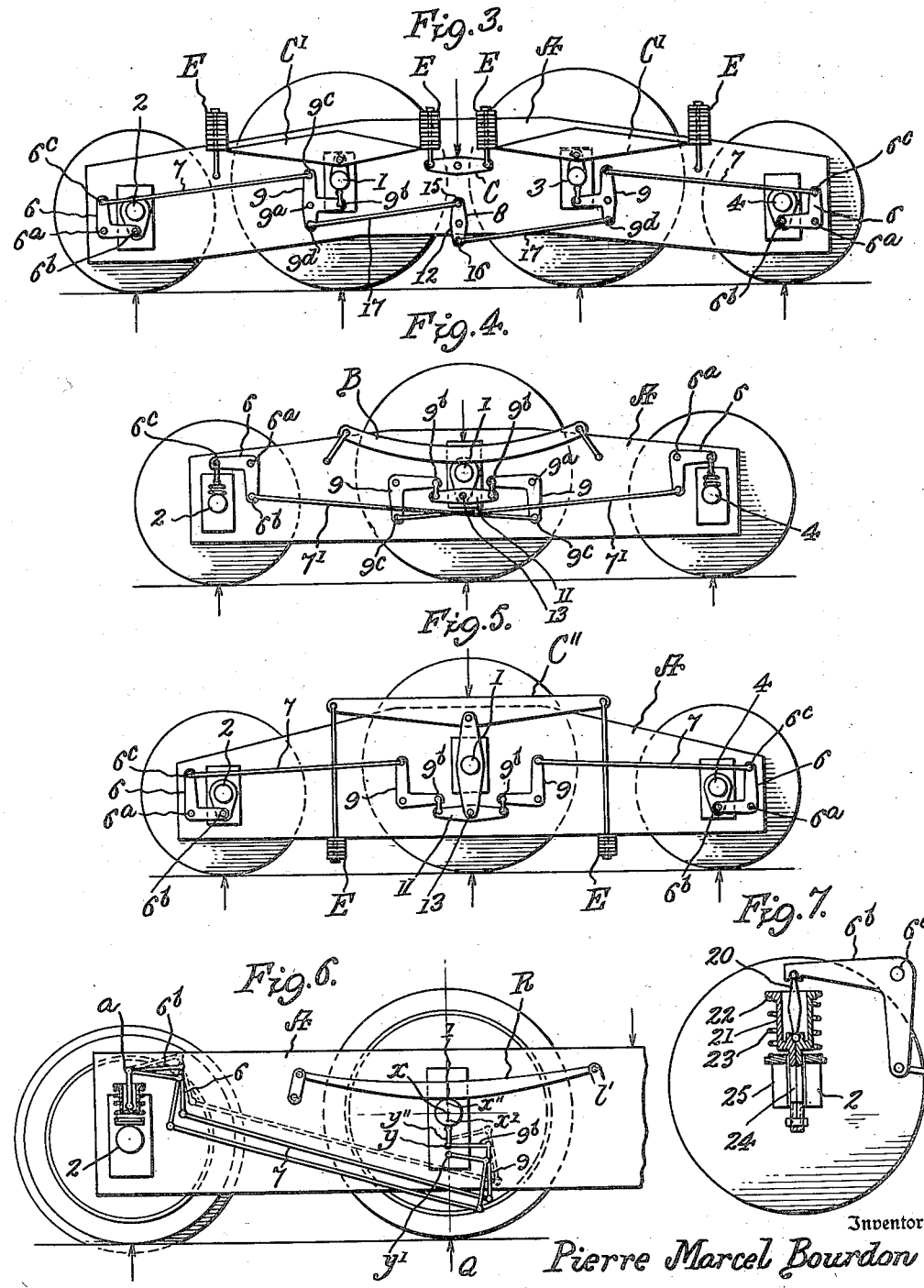

Patented June 18, 1935

2,005,607

UNITED STATES PATENT OFFICE 2,005,607

COUPLING FOR BOGIE AXLES

Pierre Marcel Bourdon, Paris, France, assignor to Michelin et Cie, Clermont-Ferrand, France, a corporation of France Application April 3, 1934, Serial No. 718,864 In France April 13, 1933

6 Claims. (Cl. 105—194)

The present invention relates to the mounting of supporting axles on the chassis frames of rail vehicle bogies or trucks.

The invention has for an object to provide a suspension arrangement for bogies having carrier wheels with their axles and pilot wheels with the axles, in which the carrier wheel axles are coupled with the pilot wheel axles in such a way that the pilot wheel axles are subject to a constant perceptible load whatever may be the variations of the load carried by the coupled axles.

This arrangement has numerous advantages which will be explained in detail later, and which generally consist mainly in the great safety of guiding the wheels mounted on the pilot axles. The results are numerous, notably the possibility of abolishing the guiding flanges of the carrier wheels and rendering derailment very difficult if not impossible.

The arrangement which is the object of the invention consists essentially in providing between each piloting axle and the main axles, in the case of two carrier wheels, or between the piloting axles and the main axle, in the case of only one wheel carrier, a coupling made of two bell-crank levers pivoting with respect to the chassis of the bogie and connected to each other by a rod or bar and in which the free branch is connected by one of the levers to the piloting axle and by the other lever to the main axle.

When there are two main or carrier axles, the connection of the bell-crank levers corresponding to the main axles are coupled together by any suitable inelastic connection.

When there is only one main axle the connection of the two corresponding bell-crank levers is effected by means of a rocking lever connected to the corresponding branches of the bell-crank levers.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a diagrammatic side elevation of the chassis of a bogie having coupled axles mounted therein according to this invention.

Figure 2 is a like view showing a modification of the spring axle suspension structure.

Figure 3 is a similar view showing another modification of the spring axle suspension structure and also of the axle coupling means.

Figure 4 is another view of the same showing further modifications both in the spring suspension and coupling means for the axles.

Figure 5 is a further modification of the same.

Figure 6 is a diagrammatic fragmentary side elevation of one end of the bogie of Figure 1, showing in full and dotted lines the relative positions of the parts under different load conditions, and Figure 7 is a fragmentary diagrammatic view of a pilot wheel and adjacent parts, showing further modifications.

In the drawings, and referring first to Figure 1, there is shown at A the chassis of the bogie. In the central part of the bogie are the main or carrier axles 1 and 3 and in the two ends of the bogie are the piloting axles 2 and 4. The horn blocks 5 allow the axles in the usual manner to be displaced in a vertical direction and maintain them in parallel relation to one another.

In the normal manner of operation, the load applied to the carrying axles and to the piloting axles, may vary. According to the invention the carrying and piloting axles are coupled by a device which permits, mainly, maintaining nearly constant the load supported by the piloting axle. This arrangement comprises an angle plate or bell-crank lever 6 pivoted on an axis 6a on the chassis A and which has one branch 6b connected to the corresponding piloting axle 2, 4 by means of a non-elastic joint or compensating spring, and the other branch 6c is connected by a rod 7 to the bell-crank lever corresponding to the main or carrying axle or axles.

A second bell-crank lever 9 pivots at 9a with respect to the chassis A of the bogie. The branch 9c of the lever 9 is attached to the rod 7 while the branch 9b is connected to the corresponding carrying axle 1 or 3 by a pivot joint which is necessarily unyielding.

As shown in Figures 1, 2, 3, there are two carrying axles 1 and 3 each branch 9b of their respective levers 9 being directly connected to the corresponding axle. On the other hand, as shown in Figures 4 and 5, when there is only one carrying axle, each branch 9b is connected to this one axle 1 by means of a rocking lever 11 pivoted at 13 to a unitary part of the axle 1. This arrangement is indispensable because the reactions of the carrying axle on the piloting axles 2—4 are balanced.

If there are two carrying axles each piloting axle may be coupled to the adjacent carrying axle by an arrangement to be described.

However it is preferable to create an interdependence between the two systems of the wheel carrying axles and the wheel piloting axles by means of a rocking lever 12, Figures 1, 2 and 3, pivoted at 8 to the bogie chassis A and at its extremities 15 and 16 to the ends of connecting rods 17 which at their other ends are pivotally secured to the branches 9c of the bell-crank levers 9.

It is to be understood that suitable springs are interposed between the chassis A of the bogie and the carrying axles or axle. The suspension arrangement varies in the different figures. As shown in Figure 1 suspension is accomplished by means of two leaf springs B joined by a rocking lever C. In the construction shown in Figure 2 the springs are replaced by a single spring B' of the cantilever type, in which the extremities are connected to the arms D integral with the axles 1 and 3.

In the construction shown in Figure 3, the suspension is obtained by a rocking lever C pivoted intermediately on the chassis A between the axles 1 and 3 and which is connected at opposite ends by elastic cushions E, comprising helical springs, superposed rubber washers or the like, to rocking arms C' pivoted on the axles 1 and 3 and connected at their opposite ends similar elastic cushion E connected to the chassis A.

In the construction shown in Figure 4, the suspension is similar to that of Figure 1 with the exception that the direction changing lever 12 is omitted and the connecting rods 7' are extended and crossed and are connected directly to the lower ends 9c of the bell-crank levers 9, the other ends 9b of the levers 9 being shackled to the ends of the arm 11 which is pivoted at its center on the single axle 1.

In Figure 3, each bell-crank lever 6 is overturned as compared with Figure 1 and has its horizontal arm 6b pivoted to a depending projection from the piloting axle 2 or 4. The vertical arm 6c has its connecting rod 7 leading to the vertical arm 9c of the main axle bell-crank 9 and the horizontal arm of the latter is connected to the adjacent main axle 1 or 3, as shown in Figure 1. However, these bell-crank levers 9 of Figure 3 have extensions 9d below their pivots for the connecting rods 17 of Figure 1.

In Figure 5 the arrangement is somewhat similar to that shown in Figure 3 with the exception that the horizontal arms 9b of the main axle bell cranks are shackled to the rocking arm 11 pivoted at 13 to the lower projection of the single main axle 1. In this form the upper projection of the main axle 1 is pivoted to the central portion of a suspension lever C'' having rods and elastic cushions E connected to the bottom of the chassis A of the bogie.

Due to the coupling arrangement which is the object of the invention there is created a dependence between the movements of the carrying axles and the piloting axles, so that by suitably arranging the bell-crank levers the variations of the load on the pilot axles 2 and 4 are rendered practically independent of the variations of the total load of the bogie, under normal conditions.

Referring now to Figure 6, if one calls, say, the flexibility of the pneumatic tire $\phi$, corresponding to the axle 1, and the flexibility of the spring R, corresponding to the same axle, and if under a normal load the position of the leverage system 6, 7 and 9 is that shown in solid lines in Figure 6, when the load Q is increased and becomes $Q'=Q+\Delta Q$, it causes a compression of the tire and a corresponding lowering of the axle 1, of an amount equal to $f'=\phi \cdot \Delta Q$. In these equations $\phi$ represents the drop of the axle for a unit increase in load, and $f'$ represents the total drop for the increase in load $\Delta Q$ where $\Delta$ represents the increment of Q. It results that the axis X of this axle drops and takes the position X'. At the same time the spring R flexes and assumes a deflection $f''$ such that $f''=\rho \cdot \Delta Q$, wherein $\rho$ represents the deflection or flexing of the spring for a unit increase in load. The total lowering of the chassis A will be then $F'=f'+f''$.

The point of articulation Y of lever 9 with the body of axle 1 lowers then to Y' and the arrangement of the system takes the position shown in double lines.

If on the other hand the load Q diminishes and becomes $Q''=Q-\Delta Q$, the diameter of the tire is increased, the flexing of the spring diminishes. Consequently the axis X of the axle 1 moves to X'' and the point Y moves to Y''. The system of rods then assumes the position shown in dotted lines.

The calculation shows that it is possible to determine the ratio of the lengths of the branches 6b and 9b of the levers 6 and 9, so that the point of attachment a of the branch 6b to the integral portion of the piloting axle 2 remains practically stationary regardless of the variations of the load Q supported by the carrying axle.

The calculations show that this condition is realized if one has $$\frac{l-l'}{l'}=\frac{\phi}{\rho}=n(I),$$

where N or I is a constant, by calling $l$ the length of the branch 6b and $l'$ the length of branch 9b.

It is the equivalent of saying that the point a remains stationary or that the load supported by the axle 2 remains constant. If therefore the condition I is fulfilled, all variations in the load will under normal conditions be carried solely by the carrying axle or axles. It is to be noted it will not be so under abnormal or accidental conditions such as, derailment, breaking of a spring, puncture.

If the lengths $l$ and $l'$ are such that the relation I be not exactly carried out the load on axle 2 will vary all the more in normal conditions with the variation of the load Q on the chassis so that it will deviate more so from the relation I.

Due to the two systems of coupling (6—7 and 9 of Figures 1, 2, 3) or system 6—7—9—11 Figures 4 and 5, the following advantages are obtained:—

(a) The constancy of the load on the piloting axles permits the obtaining for the tire of the wheel corresponding to this axle a constant compression. Also the useful height of the flange remains equally constant.

(b) In case of a puncture of a tire on the carrying wheel the load is carried by the piloting wheel coupled to it, and inversely.

(c) The derailments are rendered if not absolutely impossible, at least extremely difficult. Assuming that the carrying axle 1 is derailed, the passage of the flange on the rail makes the point 6b rise. This results then in a pivoting of the lever 6 around its axis 6a in the direction of the arrow shown. The rod 7 pulls pivots lever 9 around its axis 9a in the same direction, and the axle 1 will be raised at the point of derailment. This results in a tendency of pivoting of the bogie chassis in the opposite direction to that of derailment.

(d) Each time that the carrying axle 1 tends to lower, the load will shift to the piloting axle by the rod 7 and thus lowering is limited by the amplitude of rotation which may be given to lever 9. Consequently a carrying wheel once placed on the rail cannot leave it if the corresponding pilot wheel is on the rail.

As a result it is possible to abolish the guide flanges of the carrying wheels and simply provide these wheels with large rims or tires of sufficient diameter.

In Figures 1, 2 and 3, in the case when there are two carrier wheels, each coupled with a piloting wheel and there is provided between the two couplings of each carrier wheel with its pilot wheel, the said differential balancing device comprising a rocking lever 12 with the rods 17. Such an arrangement has the advantage of coupling the four wheels of the bogie in such a manner to render all of them interdependent. In effect the movement of points 15 and 16 are necessarily symmetrical. If the movement or displacement of the two bars 7 of each bogie are symmetrical the rods 17—17 follow the displacement without transmitting any strain.

If on the other hand there is any assymmetry or inequalibrium between the two compensating systems disposed in one part and another in the vertical plane of the bogie the differential equilibrator intervenes and tends to reestablish the equilibrium between the two systems.

For example, if the tire of the wheel mounted on axle 1 becomes punctured or deflated the corresponding lever 9 pivots in a counter-clockwise direction pulling on the rod 7 and pushing the rod 17. Consequently the part 12 pivots in a clockwise direction pulling symmetrically on the rods 17 and 7. The load initially carried by the carrier axle 1 is now carried by the carrier axle 5 and pilot axles 2 and 4.

The preceding balancing device permits, if one desires, the abolishing of safety devices against punctures.

In other words the differential equilibrator increases the safety in case of derailment. In this respect it has been shown that the branch 9b of the bell-crank lever 9 raises the corresponding carrier axle 1, for example. But with the differential equilibrator there is produced at the same time a corresponding pull on rod 17 such that the symmetrical rod 17 is pushed and the other carrier axle, axle 3 for example, is also equally raised as will be the pilot axle 4, due to the rod 7 which connects them. Under these conditions the bogie ensemble (and not simply the part of the bogie which is at the point of the pilot wheels likely to be derailed) is raised and tends to pivot around the rail opposed to that on which the derailment is produced. The act of the reaction against derailment is then much more intense.

Figure 7 shows diagrammatically a possible mounting of a spring interposed between the pilot axles and the corresponding branch of the bell-crank lever. In this arrangement the branch 6b of the lever is joined to a connecting rod 20 which has a support 21 on shoulder 22 on which bears the spring 23. The part 21 may slide with respect to the end of the axle 2 due to rod 24 sliding in guides 25.

It is obvious that various changes and modifications may be made in the details of construction and design of the above specifically described embodiment of this invention without departing from the spirit thereof, such changes and modifications being restricted only by the scope of the following claims:—

What is claimed is:—

1. In a bogie, a frame having a pair of carrier axles and a pair of pilot axles vertically movable therein, a spring mounted intermediately upon each carrier axle, anchors between the remote ends of the springs and the frame, a rocking arm mounted intermediately on the frame between the carrier axles, shackles between the opposite ends of the rocking arm and the adjacent ends of the springs for yieldably suspending the carrier axles in the frame, springs for the pilot axles and a leverage system between the carrier axles and the springs of the pilot axles to transmit motion from one axle to the other axles.

2. In a bogie, a frame having a pair of carrier axles and a pair of pilot axles movably mounted therein, suspension members pivoted at an intermediate point to the carrier axles, anchors between the remote ends of the suspension members and the frame, an equalizing device on the frame between the carrier axles and connected to the adjacent ends of the suspension members, and leverage systems between the carrier axles and the pilot axles for transmitting movements between all of the axles.

3. In a bogie, a frame, spring mounted and vertically movable carrier and pilot axles and wheels mounted on said frame, cushion tires on said wheels, a bell-crank lever pivoted on the frame for each axle, one arm of each of said bell-crank levers connected to its respective axle, a rod interconnecting the other arms of the bell-crank levers, the arms of the bell-crank levers attached to the axles relatively proportioned so that their lengths bear an algebraic relation to the coefficient of flexibility of the tires and springs such that the load supported by the pilot axle remains practically constant and independent of the total load imposed on the bogie.

4. In a bogie, a frame, spring mounted and vertically movable carrier and pilot axles and wheels mounted on said frame, cushion tires on said wheels, a bell-crank lever pivoted on the frame for each axle, one arm of each of said bell-crank levers connected to its respective axle, a rod interconnecting the other arms of the bell-crank levers, the arms of the bell-crank levers attached to the axle relatively proportioned with respect to the flexion of the tires and springs so as to provide at all times an equal load on the pilot axle.

5. In a bogie, a frame having single spring supported carrier axle and a pair of pilot axles, a bell-crank lever with two arms for each pilot axle having one of said arms connected to said axle, a pair of two armed bell-cranks for the single carrier axle, a rocking lever mounted on the carrier axle and having its ends connected each to one arm of the last named pair of bell-crank levers, and rods connecting the second arm of each of the pilot axle bell-cranks with the second arm of the corresponding carrier axle bell-crank.

6. In a bogie, a frame, carrier and pilot axles vertically movable in the frame, equalized springing means interposed between the carrier axles and the frame, and a leverage system interconnecting the pilot and carrier axles to transmit movement of any one axle to the connected axles.

PIERRE MARCEL BOURDON.